(12) United States Patent
Haddadin et al.

(10) Patent No.: US 9,844,878 B2
(45) Date of Patent: Dec. 19, 2017

(54) METHOD FOR CONTROLLING A ROBOT DEVICE, ROBOT DEVICE AND COMPUTER PROGRAM PRODUCT

(71) Applicant: DEUTSCHES ZENTRUM FÜR LUFT- UND RAUMFAHRT E. V., Köln (DE)

(72) Inventors: Sami Haddadin, Gilching (DE); Simon Haddadin, Garbsen (DE)

(73) Assignee: Deutsches Zentrum fuer Luft- und Raumfahrt e.V., Cologne (DE)

( * ) Notice: Subject to any disclaimer, the term of this patent is extended or adjusted under 35 U.S.C. 154(b) by 82 days.

(21) Appl. No.: 14/434,001

(22) PCT Filed: Oct. 7, 2013

(86) PCT No.: PCT/EP2013/070803
§ 371 (c)(1),
(2) Date: Apr. 7, 2015

(87) PCT Pub. No.: WO2014/056833
PCT Pub. Date: Apr. 17, 2014

(65) Prior Publication Data
US 2015/0239124 A1    Aug. 27, 2015

(30) Foreign Application Priority Data

Oct. 8, 2012  (DE) .......... 10 2012 218 276
Jul. 2, 2013   (DE) .......... 10 2013 212 887

(51) Int. Cl.
*B25J 9/16*      (2006.01)
*G05B 19/416*   (2006.01)
*G05B 19/4061*  (2006.01)

(52) U.S. Cl.
CPC .......... *B25J 9/1666* (2013.01); *B25J 9/1676* (2013.01); *G05B 19/4061* (2013.01);
(Continued)

(58) Field of Classification Search
CPC .......... G05B 2219/40198; G05B 2219/41387; G05B 2219/40202; G05B 19/416
See application file for complete search history.

(56) References Cited

U.S. PATENT DOCUMENTS

2003/0233171 A1* 12/2003 Heiligensetzer ....... B25J 9/1633
                                                                700/260
2007/0013336 A1*  1/2007 Nowlin ............. A61B 19/2203
                                                                318/568.21
(Continued)

FOREIGN PATENT DOCUMENTS

DE  10 2009 051 146   4/2011
DE     102010063208   6/2012
EP         1 380 393   1/2004

OTHER PUBLICATIONS

Haddadin, Sami, Alin Albu-Schäffer, and Gerd Hirzinger. "Approaching Asimov's 1st law: The impact of the robot's weight class." Robotics: Science and Systems Conference Workshop: Robot Manipulation: Sensing and adapting the real world (RSS2007), Atlanta, USA. 2007.*

(Continued)

*Primary Examiner* — Dale Moyer
(74) *Attorney, Agent, or Firm* — Davidson, Davidson & Kappel, LLC

(57) ABSTRACT

A method for controlling a robot device (500) having a movable manipulator and/or effector (400), according to which method a speed and/or direction of movement of the manipulator and/or effector (400) is monitored and adjusted as appropriate, taking into consideration medical parameters for injury and robot dynamics is provided. A robot device (500) for implementing such a method and to a computer program product for executing such a method.

17 Claims, 6 Drawing Sheets

(52) U.S. Cl.
CPC .. *G05B 19/416* (2013.01); *G05B 2219/40198* (2013.01); *G05B 2219/40202* (2013.01); *G05B 2219/40418* (2013.01)

(56) References Cited

U.S. PATENT DOCUMENTS

| 2008/0161970 | A1  | 7/2008 | Adachi et al. |          |
|--------------|-----|--------|---------------|----------|
| 2014/0012419 | A1* | 1/2014 | Nakajima      | B25J 9/1633 |
|              |     |        |               | 700/261 |
| 2014/0025204 | A1  | 1/2014 | Schlaich      |          |
| 2014/0067121 | A1* | 3/2014 | Brooks        | B25J 9/1676 |
|              |     |        |               | 700/255 |

OTHER PUBLICATIONS

Haddadin, Sami, Alin Albu-Schäffer, and Gerd Hirzinger. "Requirements for safe robots: Measurements, analysis and new insights." The International Journal of Robotics Research 28.11-12 (2009): 1507-1527.*

A. Albu-Schaffer et at, "The DLR Lightweight Robot Lightweight Design and Soft Robotics Control Concepts for Robots in Human Environments", *Industrial Robot Journal*, vol. 34, pp. 37-385, 2007.

D. Shin et al., "Hybrid actuation approach for human-friendly robot design", *IEEE Int. Conf. on Robotics and Automation* (ICRA 2008). Pasadena, USA, 2008, pp. 1741-1746.

N. Hogan, "Impedance control: An approach to manipulation: Part I—theory, Part II—implementation, Part III—applications", *Journal of Dynamic Systems, Measurement and Control*, vol. 107, pp. 1-24, 1985.

S. Haddadin et al., "Collision detection & reaction: A contribution to safe physical human-robot interaction", in *IEEE/RSJ Int. Conf. on Intelligent Robotics and Systems* (IROS2008), Nice, France, 2008, pp. 3356-3363.

A. De Luca et al., "An Adapt-and-Detect Actuator FDI Scheme for Robot Manipulators", *IEEE Int. Conf. on Robotics and Automation* (ICRA 2004), New Orleans, USA, pp. 4975-4980, 2004.

Y. Yamada et al., "Human-robot contact in the safeguarding space" *IEEE/ASME Transactions on Mechatronics*, vol. 2, No. 4, pp. 230-236, 1997.

K. Ikuta et al., "Safety evaluation method of design and control for human-care robots", *The Int. J. of Robotics Research*, vol. 22, No. 5, pp. 281-298, 2003.

A. Bicchi et al., "Fast and soft arm tactics: Dealing with the safety-performance tradeoff in robot arms design and control", *IEEE Robotics and Automation Magazine*, vol. 11, No. 2, pp. 22-23, 2004.

M. Zinn et al., "A new actuation approach for human-friendly robot design", *International Journal of Robotics Research*, vol. 23, No. 4/5, pp. 379-398, 2005.

J. Heinzmann et al., "Quantitative safety guarantees for physical human-robot interaction", *The Int. J. of Robotics Research*, vol. 22, No. 7-8, pp. 479-504, 2003.

S. Oberer et al., "Robot-dummy crash tests for robot safety assessment", *IEEE Int. Conf. on Robotics Automation* (ICRA 2007), Rome, Italy, pp. 2934-2939, 2007.

J.-J. Park et al., "Collision analysis and evaluation of collision safety for service robots working in human environments", *International Conference on Advanced Robotics*, ICAR 2009, pp. 1-6, 2009.

D. Gao et al., "On the use of the head injury criterion (HIC) to assess the danger of robot impacts", *IEEE Robotics and Automation Mag.*, vol. 16, No. 4, pp. 72-74, 2009.

B. Povse et al., "Industrial robot and human operator collision", *IEEE Int. Conf. on Systems Man and Cybernetics* (SMC 2010), Istanbul, Turkey, pp. 2663-2668, 2010.

S. Haddadin et al., "Safe Physical Human-Robot Interaction: Measurements, Analysis & New Insights", *International Symposium on Robotics Research* (ISRR 2007), Hiroshima, Japan, pp. 439-450. 2007.

M. Wassink et al., "Towards a novel safety norm for domestic robots", *IEEE/RS J. Int. Conf. on Intelligent Robots and Systems* (IROS 2007), San Diego, USA, pp. 3243-3250, 2007.

S. Haddadin et al., "Safety Evaluation of Physical Human-Robot Interaction via Crash-Testing", *Robotics: Science and Systems Conference* (RSS2007), Atlanta, USA, 2007.

S. S. Haddadin et al., "Requirements for Safe Robots: Measurements, Analysis & New Insights", *Int J. of Robotics Research*, vol. 28, No. 11, pp. 1507-1527, 2009.

S. Haddadin et al., "The DLR Crash Report: Towards a Standard Crash-Testing Protocol for Robot Safety—Part I: Results", *IEEE Int. Conf. on Robotics and Automation* (ICRA 2008), Kobe, Japan, pp. 272-279, 2009.

J. Park et al., "Designing optimally safe robot surface properties for minimizing the stress characteristic curves of human-robot collision", *IEEE Int. Conf. on Robotics and Automation* (ICRA 2011), Shanghai, China, pp. 5413-5420, 2011.

T.P.Ruedi et al., *AO Principles of Fracture Management*, Thieme, ED., 2007.

S. Haddadin et al., "On making robots understand safety: Embedding injury knowledge into control", *Int. J. of Robotics Research*, 2012.

O. Khatib, "Inertial properties in robotic manipulation: an object-level framework", *Int. J. Robotics Research*, vol. 14, No. 1, pp. 19-36, 1995.

* cited by examiner

METHOD FOR CONTROLLING A ROBOT DEVICE, ROBOT DEVICE AND COMPUTER PROGRAM PRODUCT

The invention relates to a method for controlling a robot device having a movable manipulator and/or effector, to a robot device having a movable manipulator and/or effector, and to a control unit having a computing unit and a memory unit for carrying out such a method as well as to a computer program product that can be loaded into a computing unit and that encompasses software code segments with which such a method is carried out when the product is running on the computing unit.

BACKGROUND

Close physical human-robot interaction (pHRI) is one of the great challenges in robotic research. Some robot systems have already attained the requisite control-technology capabilities to perform delicate and complex manipulations as well as human-robot interaction (HRI) tasks that require a dynamic exchange of forces between the robot and the environment. In this context, reference is made to the following publications: A. Albu-Schäffer, S. Haddadin, C. Ott, A. Stemmer, T. Wimböck and G. Hirzinger, "The DLR Lightweight Robot Lightweight Design and Soft Robotics Control Concepts for Robots in Human Environments", *Industrial Robot Journal*, vol. 34, pp. 376-385, 2007, and D. Shin, I. Sardellitti, and O. Khatib, "Hybrid actuation approach for human-friendly robot design", in *IEEE Int. Conf. on Robotics and Automation* (ICRA 2008), Pasadena, USA, 2008, pp. 1741-1746.

This approach has made it possible, for instance, to carry out difficult assembly tasks that, up until now, had been performed manually. In particular, the achieved delicate and fast manipulation capabilities of these robots help in avoiding damage to potentially fragile objects, in addition to which they are fundamentally far less dangerous to the humans who are going to interact with the device. In this context, reference is made to the followings publications: N. Hogan, "Impedance control: An approach to manipulation: Part I—theory, Part II—implementation, Part III—applications", *Journal of Dynamic Systems, Measurement and Control*, vol. 107, pp. 1-24, 1985, S. Haddadin, A. Albu-Schäffer, A. D. Luca and G. Hirzinger, "Collision detection & reaction: A contribution to safe physical human-robot interaction", in *IEEE/RST Int. Conf. on Intelligent Robots and Systems* (IROS2008), Nice, France, 2008, pp. 3356-3363, and A. De Luca and R. Mattone, "An Adapt-and-Detect Actuator FDI Scheme for Robot Manipulators", *IEEE Int. Conf. on Robotics and Automation* (ICRA 2004), New Orleans, USA, pp. 4975-4980, 2004.

In order to allow such physical interaction between humans and robots, there has been a great deal of interest in removing classic safety barriers such as protective fences or light sensors for "human-friendly" robots that are capable of direct interaction. For purposes of defining the required safety regulations, it is, of course, necessary to first understand what a robot for such tasks should be like and also how it is controlled, so that it can operate safely in a human environment. Here, it must fundamentally be ensured that a human will not suffer any severe injuries, even in a worse-case scenario. Based on the pioneering work of Yamada, in which human tolerance to pain was introduced as a safe collision criterion of a robot, others have expanded this field of research. In this context, reference is made to the publication by Y. Yamada, Y. Hirasawa, S. Huang, Y. Umetani and K. Suita, "Human-robot contact in the safeguarding space" *IEEE/ASME Transactions on Mechatronics*, vol. 2, no. 4, pp. 230-236, 1997.

In particular, new drive technologies, interaction-regulation algorithms and robot-human collision-injury models have been introduced. In this context, reference is made to the following publications: K. Ikuta, H. Ishii, and M. Nokata, "Safety evaluation method of design and control for human-care robots", *The Int. J. of Robotics Research*, vol. 22, no. 5, pp. 281-298, 2003, A. Bicchi and G. Tonietti, "Fast and soft arm tactics: Dealing with the safety-performance tradeoff in robot arms design and control", *IEEE Robotics and Automation Magazine*, vol. 11, no. 2, pp. 22-23, 2004, M. Zinn, O. Khatib, B. Roth, and J. K. Salisbury, "A new actuation approach for human-friendly robot design", *International journal of Robotics Research*, vol. 23, no. 4/5, pp. 379-398, 2005, J. Heinzmann and A. Zelinsky, "Quantitative safety guarantees for physical human-robot interaction", *The Int. J. of Robotics Research*, vol. 22, no. 7-8, pp. 479-504, 2003, S. Oberer and R.-D. Schratt, "Robot-dummy crash tests for robot safety assessment", in *IEEE Int. Conf. on Robotics and Automation* (ICRA 2007), Rome, Italy, 2007, pp. 2934-2939, J.-J. Park and J.-B. Song, "Collision analysis and evaluation of collision safety for service robots working in human environments", in *Advanced Robotics, 2009. ICAR 2009. International Conference on*, 2009, pp. 1-6, D. Gao and C. Wampler, "On the use of the head injury criterion (HIC) to assess the danger of robot impacts", *IEEE Robotics and Automation Mag.*, vol. 16, no. 4, pp. 71-74, 2009, B. Povse, D. Koritnik, R. Kamnik, T. Bajd, and M. Munih, "Industrial robot and human operator collision", in *IEEE Int. Conf. on Systems Man and Cybernetics* (SMC 2010), Istanbul, Turkey, 2010, pp. 2663-2668, S. Haddadin, A. Albu-Schäffer, and G. Hirzinger, "Safe Physical Human-Robot Interaction: Measurements, Analysis & New Insights", in *International Symposium on Robotics Research* (ISRR 2007), Hiroshima, Japan, 2007, pp. 439-450, M. Wassink and S. Stramigioli, "Towards a novel safety norm for domestic robots", *IEEE/RS J. Int. Conf. on Intelligent Robots and Systems* (IROS 2007), San Diego, USA, pp. 3243-3250, 2007, and ISO 10218, "Robots for industrial environments—Safety requirements—Part 1: Robot", 2006.

This fact shows that the analysis and the understanding of injuries in the realm of robotics are an essential prerequisite in order to make genuine pHRI possible, also in actual applications.

In recent years, some of the first safety studies in robotics have been carried out, which provide insights into the potential injuries that humans would suffer as a result of a collision with a robot. In this context, reference is made to the following publications: S. Haddadin, A. Albu-Schäffer, and G. Hirzinger, "Safety Evaluation of Physical Human-Robot Interaction via Crash-Testing", *Robotics: Science and Systems Conference* (RSS2007), Atlanta, USA, 2007, "Requirements for Safe Robots: Measurements, Analysis & New Insights", *Int. J. of Robotics Research*, vol. 28, no. 11, pp. 1507-1527, 2009, S. Haddadin, A. Albu-Schäffer, M. Frommberger, J. Roßmann, and G. Hirzinger, "The DLR Crash Report": Towards a Standard Crash-Testing Protocol for Robot Safety-Part I: Results", in *IEEE Int. Conf. on Robotics and Automation* (ICRA 2008), Kobe, Japan, 2009, pp. 272-279, and J. Park, S. Haddadin, J. Song, and A. Albu-Schäffer, "Designing optimally safe robot surface properties for minimizing the stress characteristic curves of human-robot collisions", in *IEEE Int. Conf. on Robotics and Automation* (ICRA 2011), Shanghai, China, 2011, pp. 5413-

5420. So far, the discussion and analysis of various worst-case HRI scenarios have been conducted according to the following scheme:
1) selection and/or definition and classification of the type of collision
2) selection of the applicable injury analysis method
3) assessment of the potential injury to a human
4) quantification of the influence of the relevant robot parameters
5) assessment of the efficiency of the countermeasures for minimizing and/or preventing injuries This analysis yielded the foundations of injury processes, for instance, in the case of fast, blunt impact, dynamic and quasi-static pinching, or cuts and punctures caused by sharp tools.

It can be generally summarized that the analysis of injuries became a significant part of robot research since the international standard associations have also started to adopt requirements for safe robots. The fact that there is an expectation that it should be possible to limit potential injuries to very minor blunt injuries also underscores the general need to become involved in this interdisciplinary field. The sooner research yields new insights into understanding injuries in the realm of robotics, the sooner it will be possible to introduce HRI tasks in the real world.

Another unsolved problem in the realm of safety in robotics is how to incorporate the rather general understanding of injuries into regulations that apply to robots. Insights into injuries in the realm of robotics are normally employed to promote a safer mechanical design or to demonstrate that a given mechanical design has a positive influence on potential injuries in the case of an accidental collision. Up until now, knowledge about injuries has not been explicitly incorporated into the regulations as a restriction that has to be observed.

Moreover, German patent application DE 10 2009 051 146 A1 discloses a device used in iron and steel works and/or in rolling mills comprising a robot that is controlled with types and modes of operation that influence an associated human-robot interface and that are configured so as to be adapted and/or adaptable to varying degrees of automation of the robot and/or to a different time-related and/or location-related positioning of humans and robots as interacting members in a workplace, whereby the robot, especially an industrial robot, is associated with at least one protected area that is monitored by detection elements that interact with the robot, especially an industrial robot, whereby the extension and functionality of said protected area are configured so as to be varied and/or variable in terms of the robot activities and/or the robot working positions, and whereby the robot, especially an industrial robot, is arranged on or in a moving device that can run on a track surface so as to create a solution that allows a more flexible adaptation of a robot or robot system to different degrees of human-robot interaction as well as a more flexible use of an industrial robot within the scope of work activities and work flows in a large-scale plant, especially iron and steel works.

Moreover, German patent application DE 10 2010 063 208 A1 discloses a method for operating a safety mechanism for a handling device, especially an industrial robot, having a movable gripper and having at least one sensor that at least largely surrounds the gripper in order to detect at least potential collisions with objects that are in the path of movement of the gripper, whereby, if the risk of a collision is detected, a signal is generated by a control unit, resulting in a change in the movement sequence of the gripper along its path of movement, wherein the changed movement sequence is a controlled reduction in the speed of movement of the gripper, so that a method for operating a safety means for a handling device, especially an industrial robot, is refined in such a way that it is possible to easily restart or continue to operate the handling device once the risk of a collision has been eliminated.

SUMMARY OF THE INVENTION

It is an object of the present invention to provide the above-mentioned method which has been functionally improved, and also the above-mentioned robot device and the above-mentioned computer program product. In particular, biomechanical and/or medical knowledge should be rendered useable for controlling a robot device. In particular, the robot device should be rendered capable of safely interacting with a human being in overlapping working areas. In particular, the risk of injury to humans should be reduced or ruled out. In particular, the robot device should be rendered capable of assessing the consequences of an anticipated collision with the body of a human. The robot device should especially be rendered capable of adapting its speed and/or direction of movement on the basis of this assessment. In particular, a method is to be made available with which there is no need for external sensors such as cameras.

The present invention provides a method for controlling a robot device having a movable manipulator and/or effector in which the speed and/or direction of movement of the manipulator and/or effector is monitored and, if applicable, adapted, taking into consideration medical injury parameters and the dynamics of the robot.

The manipulator and/or effector can be moved along a prescribed path. The manipulator and/or effector can be moved at a prescribed speed. The medical injury parameters can contain information that is representative for the effect of a collision between the body of a human being and the manipulator and/or effector. The effect can be injury to the body of a human being. These medical injury parameters can be employed in the method as input quantities. The speed and/or direction of movement of the manipulator and/or effector can be adapted in order to reduce and/or prevent the injury. The speed of the manipulator and/or effector can be adapted by being reduced.

The robot dynamics can be physical dynamics. The robot dynamics can be kinetic dynamics. The robot dynamics can be the dynamics of a rigid and elastic multibody system. In order for the speed and/or direction of movement of the manipulator and/or effector to be monitored and, if applicable, to be adapted, the impact mass, the impact velocity and/or the impact-contact geometry of the manipulator and/or effector can be taken into consideration. The impact mass, the impact velocity and/or the impact-contact geometry of the manipulator and/or effector can be employed as input quantities in the method. The anticipated impact mass, the impact velocity and/or the impact-contact geometry of at least one prescribed relevant point of the manipulator and/or effector can be taken into consideration. The anticipation can refer to a suspected or known place where a human being is present in the working area of the robot device, taking into account the prescribed path of movement.

For purposes of monitoring and, if applicable, adapting the speed and/or direction of movement of the manipulator and/or effector, it is possible to turn to characteristic values that reflect a relationship between the impact mass, the impact velocity and/or the impact-contact geometry of the manipulator and/or effector on the one hand, and medical injury parameters on the other hand. The characteristic values can be depicted in mass-velocity diagrams for different contact geometries and different types of injury. The contact geometries can be simple representative geometries. A contact geometry can be wedge-shaped. The contact geometries can be wedge-shaped and can have different angles. A contact geometry can be spherical. The contact geometries can be spherical and can have different diameters. One type of injury can be an injury in which the person's skin remains closed. One type of injury can be an injury to the muscles or tendons of a person's body. One type of injury can be a neurovascular injury to a person's body. One type of injury can be the fracture of bones in a person's body. One type of injury can be an injury to the eyes and/or the larynx.

The medical injury parameters can be obtained from a memory unit. The memory unit can be a database. The medical injury parameters can be taken from an injury database. The medical injury parameters can be ascertained by means of experiments. The medical injury parameters can have been ascertained by means of experiments with the bodies of animals, for instance, the bodies of pigs. The medical injury parameters can have been ascertained by means of drop tests. The medical injury parameters can have been ascertained by means of experiments with human corpses or animal cadavers. The medical injury parameters can have been ascertained by means of experiments involving human or animal test subjects.

At least one adjustable threshold value can be taken into consideration when monitoring and, if applicable, adapting the speed and/or direction of movement of the manipulator and/or effector. The threshold value can be employed in the method as an input quantity. Before the speed and/or direction of movement of the manipulator and/or effector is adapted, an adjustment can be made to the threshold value. The threshold value can represent a maximally permissible effect on the body of a human being. The threshold value can be variable. An increase in the threshold value can bring about an increase in the maximally permissible effect and an increase in the productivity of the robot device. A reduction in the threshold value can bring about a reduction in the maximally permissible effect and a reduction in the productivity of the robot device.

The method can be carried out in real time. An expected impact mass, impact velocity and/or impact-contact geometry can be ascertained in real time. A memory unit containing medical injury parameters can be accessed in real time. The expected impact mass, impact velocity and/or impact-contact geometry can be compared to the medical injury parameters in real time. An adjustable threshold value can be adjusted in real time. An adaptation of the speed and/or direction of movement of the manipulator can take place in real time.

The method can be carried out on the level of commands or on the level of measured values. The command level can be a control level on which measured values for the movement are prescribed to the manipulator and/or effector. The method can be carried out on the level of target values. This can be advantageous for a robot device having a relatively rigid manipulator and/or effector, in other words, a robot device in which a only slight deviation occurs between the target values and the actual values during a movement.

The measured-value level can be a control level on which the actual values of the manipulator and/or effector during a movement are output. This can be advantageous in the case of a robot device with a relatively soft manipulator and/or effector, in other words, a robot device in which a marked deviation occurs between the target values and the actual values during a movement.

Moreover, the objective upon which the invention is based is achieved by means of a robot device having a movable manipulator and/or effector and a control unit having a computing unit and a memory unit, whereby the robot device is suitable for carrying out such a method. The robot device can be an industrial robot. The effector can be arranged on the manipulator. The manipulator can have a base. The manipulator can have at least one arm section. The manipulator can have at least one articulation. The manipulator can have at least one axis of motion. The manipulator can have at least one drive, especially an electric-motor drive. The manipulator can have at least one transmission. The control unit can serve to control the manipulator. The control unit can be connected to the manipulator and/or effector so as to carry signals. The control unit can generate output signals for the manipulator. The control unit can receive and process input signals from the manipulator and/or effector. The computing unit can process data by using a programmable calculation specification. The memory unit can serve to provide the data. This data can contain injury parameters.

Moreover, the objective upon which the invention is based is achieved by means of a computer program product that can be downloaded into a computing unit and that can comprise software code segments with which such a method is carried out when the product is running on the computing unit. The computer program product can be implemented in a memory unit. The memory unit can be suitable for storing data. The memory unit can have an electronic, magnetic and/or optical memory medium. In particular, the memory unit can have a memory card, a flash memory, a USB stick, a solid-state drive, a hard disk, a magnetic tape, a diskette, a CD or a DVD. The computer program product can be transmitted. The computer program product can be transmitted via a network, especially a hard-wired or wireless network.

Thanks to the invention, biomechanical and/or medical knowledge is rendered useable for controlling a robot device. The robot device is rendered capable of safely interacting with a human being in overlapping working areas. The risk of injury to humans can be reduced or ruled out. The robot device is rendered capable of assessing the consequences of an anticipated collision with the body of a human. The robot device is rendered capable of adapting its speed and/or direction of movement on the basis of this assessment. A method is made available with which there is no need for external sensors such as cameras.

The invention puts forward a concrete approach to achieving the above-mentioned objectives. First of all, a relationship between the impact mass, the velocity, the geometry and the medically visible soft-tissue injuries can be studied, for example, by means of systematic drop-test experiments on pig abdominal wall specimens. Alternatives would be, for instance, pendulum tests or direct robot-collision tests. The injuries that occur can be classified in accordance with the AO international medical classification, which also deals with concomitant soft-tissue injuries. In this context, reference is made to the publication by T. P. Rüedi, R. E. Buckley, and C. G. Morgan, *AO Principles of Fracture Management*, Thieme, Ed., 2007. Owing to the growing need for international robotics standardization to focus on minor contusions, this can also be included in an analysis. These general insights can then be integrated into an injury-based velocity controller which can dynamically change a desired target velocity, taking into consideration an instantaneous dynamic robot property. In particular, a Cartesian impact velocity and a reflected inertia of the robot, which is the "felt" scalar mass along the collision directions, can be evaluated.

In other words, previously acquired injury knowledge can be incorporated into a movement regulator, so that no trajectories are executed that would exceed a certain injury limit.

The word "can" is especially used to indicate optional features. Accordingly, in each case, there is one embodiment of the invention that has the appertaining feature or the appertaining features.

BRIEF DESCRIPTION OF THE DRAWINGS

Embodiments of the invention will be described in greater detail below making reference to figures. Additional features and advantages ensue from this description. Concrete features of these embodiments can constitute general features of the invention. Features of these embodiments combined with other features can also constitute individual features of the invention.

The following is shown schematically by way of an example.

DETAILED DESCRIPTION

Figure 1:
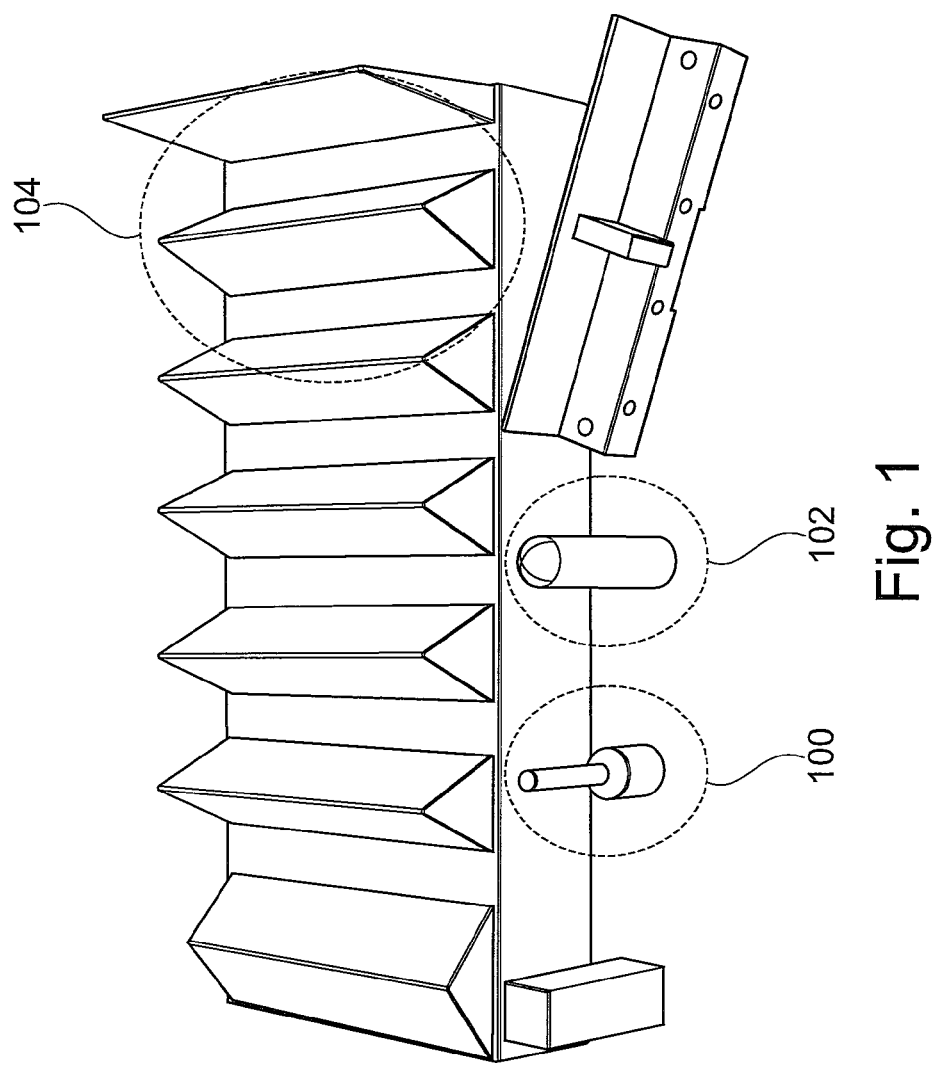
FIG. 1: a selection of contact primitives for soft tissue experiments.

Introduction, approach:

Within the scope of the present invention, robot systems for human-robot interaction (HRI) are to be designed safely without simply introducing generalized limits as was the case, for instance, in ISO 10218-2006. All of the results and insights presented there are of a very general nature and are not tailor-made for a specific robot design. In principle, the present results, analyses and control algorithms can be useful for any robot. To begin with, it is necessary to understand the influence of a generic collision between a robot and a human. To be more precise, the question arises as to what the relationship is between the impact mass, the impact velocity and the contact geometry as well as the injuries that occur. This information can then be used to develop a control algorithm that utilizes this knowledge in such a way that the concrete significance of what constitutes a safe interaction is transmitted on a very low algorithmic level to the robot. This approach is especially useful so that a robot can move as quickly as possible while ensuring human safety. Fundamentally speaking, this provides an answer to the question, "How fast can I move without hurting someone?". Before the aspect of soft-tissue injuries in robotics can be understood, it is first necessary to generate sufficient biomechanical injury data so that sufficiently meaningful safety limits can be formulated. Since, until now, neither biomechanics nor forensic medicine has actually focused on minor injuries, there is a need for adequate collision tests to be conducted in order to ascertain the relationship between "input" robot parameters, reflected inertia, velocity and impact geometry, and to acquire information about the resulting injury. Since it is not possible to test every conceivable contact geometry, sufficiently informative relevant primitives are determined in a first step. Subsequently, numerous drop tests are carried out with fresh pig-abdominal wall specimens employing different masses and velocities for specific primitives. The analyses can be expanded to other parts of the body. However, the experiments so far have already generated an enormous amount of data so that yet more experiments might actually obscure the essence of the work. For this reason, one single body region will be examined here. The injury that might have been caused is then medically assessed according to the following scheme:

1) direct medical examination of the impact area
2) preparation and injury analysis
3) histopathological examination Using the above-mentioned AO classification, the observed injury is then classified into standardized injury classes. Here, three selected primitives were evaluated on the basis of hundreds of drop tests. Here, the focus will instead be concentrated on developing an approach rather than on merely generating an extremely large volume of raw data. Data for more primitives and parts of the body can still be accumulated. In order for the functional relationship—robot parameter→injury—to be rendered useable for robot regulation and control, risk curves are derived for the given primitives. This makes it possible to derive a simple and intuitive representation of the relationship—robot parameter→injury—which can then be stored in a real-time database. The acquired injury knowledge is now available in a real time-capable structure and it can be integrated into a velocity controller. The proposed controller takes into account the reflected dynamics of the robot at relevant structure points as well as its velocity and surface characteristics. The framework elicits a safe collision behavior for a robot in case of an unanticipated collision with a human. It should also be mentioned that previous work on blunt impact analyses can be seamlessly integrated into this algorithm.

Medical Evaluation:

The relevant medical conventions as well as the drop-test experiments carried out will be described below. Subsequently, injuries that were observed during the experiments are evaluated medically. The medical analysis is carried out in three phases:

1) direct observation after the drop test
2) macroscopic patho-anatomical analysis
3) microscopic patho-anatomical analysis All of the phases are explained in detail. However, in order for acquiring a better understanding of the results of the observation, the drop-test experiments will be presented first. A detailed description of the protocol is presented in the publication by S. Haddadin, S. Haddadin, A. Khoury, T. Rokahr, S. Parusel, R. Burgkart, A. Bicchi, and A. Albu-Schäffer, "On making robots understand safety: Embedding injury knowledge into control", *Int. J. of Robotics Research*, 2012.

Drop-Test Experiments

For the experimental injury analysis, a protocol was chosen that is based on the principle of a free fall. The set-up comprises a force sensor as well as two acceleration sensors that measure the acceleration of the carriage and of the impactor and that are employed to determine the impact velocity. The maximum pressure that occurs is measured using a pressure-indicating film.

Since there is a large selection of possible contact geometries for such tests, a representative selection of tools and classes was drawn up. FIG. 1 shows a selection of contact primitives for soft tissue experiments. The circled primitives are used in the test series and are designated here as a small sphere 100, a large sphere 102 and a wedge 104. The specific design is based on typical geometric primitives from industrial processes.

The small sphere 100 has a radius R=5 mm and a mass of 2.1 kg. The large sphere 102 has a radius R=12.5 mm and a mass of 2.2 kg. The wedge 104 has a wedge angle of 45° with a fillet radius r=0.2 mm, a width L=200 mm and a mass of 2.7 kg.

The selected contact geometries already cover numerous industrial grippers or objects that are to be gripped. The analysis methodology employed for the medical evaluation of the observed injuries will be explained below.

Analysis Methodology:

1) AO classification and macroscopic analysis: in medicine, minor injuries are generally treated as secondary injuries that accompany fractures. In this context, the AO classification of the "Arbeitsgemeinschaft für Osteosynthesefragen" [Association for the Study of Internal Fixation] is one of the most important internationally. In this context, reference is made to the publication by S. Haddadin, S. Haddadin, A. Khoury, T. Rokahr, S. Parusel, R. Burgkart, A. Bicchi, and A. Albu-Schïffer, "On making robots understand safety: Embedding injury knowledge into control", *Int. J. of Robotics Research*, 2012. This classification is at times also known as the Müller classification after the Swiss surgeon and pioneer of orthopedic surgery, Maurice Edmond Müller. In the English-speaking world, it is often referred to as ASIF (Association for the Study of Internal Fixation). This classification aims at establishing a description of fractures of the human skeleton that is uniform and unambiguous worldwide. Moreover, there is a subgroup in the AO classification that deals with concomitant injuries such as, for instance, skin and soft-tissue injuries (muscles, ligaments, tendons, nerves and vessels). This subgroup was chosen for purposes of allowing a precise and objective description of the experimentally induced injuries. The goal of the AO classification is to improve communication among physicians and to improve systematic documentation and research. Consequently, sensible therapeutic approaches are to be selected that are based on appropriate, clearly described and easily accessible data, thus forming the foundation for today's evidence-based medicine. The groupings of the AO classification used here are:

1) skin injuries (I)
2) muscle and tendon injuries (MT) and
3) vascular and nerve injuries (NV)

Moreover, these classes are divided as follows:

Skin Injury in Case of a Closed Fracture:
IC1: no skin injury
IC2: contusion without breaking of the skin
IC3: circumscribed décollement
IC4: extensive, closed décollement
(IC5: necrosis due to deep contusion)

Open Skin Injury:
(IO1: skin puncture from the inside to the outside)
IO2: skin puncture from the outside <5 cm with contused edges
IO3: skin lesion >5 cm, circumscribed décollement with edge contusion
IO4: skin loss, deep contusion, abrasion
IO5: (extensive décollement)

Muscle and Tendon Injuries:
MT1: no injury
MT2: circumscribed muscle injury (limited to one muscular compartment)
MT3: extensive muscle injury (in two or more muscular compartments)
(MT4: avulsion or loss of entire muscular compartments, severed tendons)
(MT5: compartment or crush syndrome)

Neurovascular Injuries:
NV1: no injury
NV2: isolated nerve lesion
NV3: circumscribed vascular injury
NV4: combined neurovascular injury
(NV5: subtotal or total amputation)

Here, IC2 is considered to be the appropriate limit value and it is designated as an indicator of the "key impact". In addition to the evaluation on the basis of the AO classification, the widths, lengths and depths of the lesions that occur are manually measured using calipers. For documentation purposes, photos are made of each specimen before and after each test series. A preliminary observation and evaluation were made after each impact. Upon conclusion of a test series, the specimen is removed from the test set-up in order to undergo a thorough examination. First, the skin surface is examined and classified according to IC1-5 or IO2-5. If no obvious breaking of the skin can be ascertained, specimens of 1 $cm^3$ are removed and fixed in formalin for purposes of later microscopic examinations. The objective of the microscopic analysis is to make a detailed distinction, which in certain cases would not be possible only with a macroscopic analysis. Abdominal wall tissue was selected as the first test tissue because, with it, it is relatively easy to carry out drop tests under equivalent impact conditions.

Figure 2:
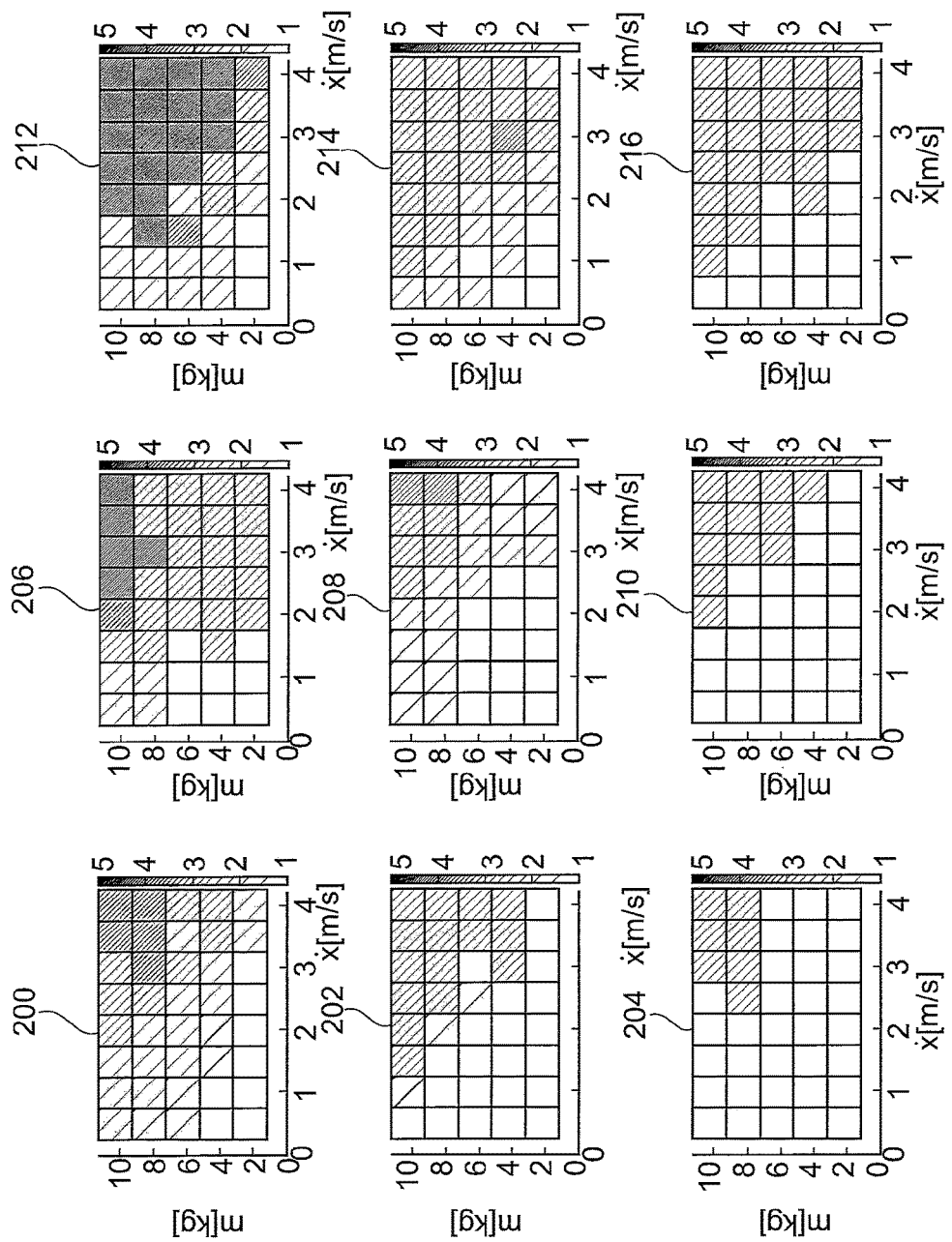
FIG. 2: the dependence of an AO classification on the impact mass and impact velocity for different contact primitives.

Results:

It should be pointed out that the evaluation presented here is a summary of the observations which are especially intended to serve for the design of the controller described below rather than to serve for the interpretation of the results. FIG. 2 summarizes the risk characteristic curves obtained from the tests and shows the dependence of the AO classification on the impact mass and impact velocity for various contact primitives. The first column with diagrams 200, 202, 204 shows the dependence of the AO classification on the impact mass and impact velocity for a wedge (see FIG. 1 and the appertaining description), the center column with diagrams 206, 208, 210 shows the dependence of the AO classification on the impact mass and impact velocity for a large sphere (see FIG. 1 and the appertaining description), while the right-hand column with diagrams 212, 214, 216 shows the dependence of the AO classification on the impact mass and impact velocity for a small sphere (see FIG. 1 and the appertaining description). The top row with diagrams 200, 206, 212 shows the results for closed skin injuries, the center row with diagrams 202, 208, 214 depicts the results for muscle and tendon injuries while the bottom row with diagrams 204, 210, 216 shows the results for neurovascular injuries.

As already mentioned, a key impact is ascribed to each impactor, each velocity as well as each mass. The key impact is the maximally permissible injury that is allowed to occur. It is defined here as contusion. Of course, this definition is not sufficient if the skin remains completely intact but the tissue underneath it is injured. This is particularly the case when nerves and arteries are involved. The third class of soft-tissue injuries, neurovascular damage, is already possible in cases of penetrating muscle injuries since major neurovascular structures are located underneath the muscles. Consequently, the key impact is selected as a function of the estimated injury to the human being, namely, it has to be totally reversible (restitutio ad integrum), that is to say, it must not leave any permanent damage. If the results are not unambiguous, the key impact is determined using the most conservative interpretation. The results of the drop test are then integrated into the real-time robot control procedure as will be described below. Each medical result is integrated into the injury database, which will be elaborated upon below.

FIG. 2 shows the relationships between mass, velocity and injury for 276 drop tests. Each impactor, wedge, large sphere, small sphere is associated with a column depicting the skin injuries, muscle and tendon injuries as well as neurovascular injuries. The severity of the tissue damage (ranging from one to five as set forth in the AO classification) is represented by rectangular grayscale fields. White areas stand for impacts that do not cause injury (IC1, MT1 or NV1). Black areas represent the most severe injury possible. Here, it should be noted that in diagram 212, closed as well as open skin injuries are shown together in one graph. Here, black areas designate open skin injuries and non-closed skin injuries with by IC5 (necrosis due to deep contusion).

Skin injuries caused by the wedge-shaped impactor are limited to contusions and closed décollements. Only masses >8 kg and impact velocities of at least 3.0 m/s lead to more severe contusions and décollements. The most severe injuries for the large sphere are small avulsions≈10 mm². At velocities below 2 m/s, the large sphere only causes minor skin damage. Neither the large sphere nor the wedge were able to completely pierce the skin, which was verified macroscopically as well as microscopically. In contrast, the small sphere pierces the skin at relatively low velocities and masses. Safety in case of abdominal impacts can only be guaranteed for velocities <2 m/s and masses <6 kg. The wedge impacts caused only negligible muscle injuries in all of the tests up to 1.5 m/s. Even above this velocity, most of the injuries could be considered as harmless.

Consequently, the wedge entailed a relatively wide safety margin for muscle tissue. Muscle injuries caused by the larger sphere at >8 kg can be seen as tolerable up to 1.5 m/s. The results for the small sphere show similar degrees of severity of damage to the muscle tissue. The maximum velocity should not exceed 1.5 m/s. In the case of greater masses, the velocity should be limited to 1.0 m/s. As already mentioned above, neurovascular injuries are selected as a function of the muscle penetration. However, no examination of this type of injury was carried out here since it is not possible to conduct an adequate evaluation using non-living tissue.

Mention should be made of the fact that all of the experiments conducted entail certain conditions that deviate from real human-robot collisions. These are primarily due to the use of non-living tissue. In comparison to living tissue, non-living tissue lacks several properties such as muscle tone, pre-stretching of the skin and, of course, the possibility of evading the impact. Moreover, it is not possible to examine functional damage such as, for example, arterial/venous hemorrhaging, pain or neurological failure. Nevertheless, the experiments carried out and their results tend more to reflect a worst-case scenario, rather than focusing on ameliorating possible outcomes. Safety curves will be derived below which are suitable for a real-time evaluation so that, on the basis of its current state (reflected inertia, instantaneous speed and surface), a robot is capable of drawing conclusions about its potential for causing injury in the case of unanticipated collisions. It is shown how this representation can be used in a closed control loop so that the robot does not exceed the applicable medical limit values.

Knowledge-Based Real-Time Control:

Safety Characteristic Curves for Robot Control:

The objective of the present invention is to understand how soft tissue responds under different impact test conditions, in order to find suitable model parameters that make it possible to predict the occurrence of a particular injury and then to integrate this knowledge into a control unit for safe robot speeds. Even though additional experimental data is helpful for a complete understanding of the mapping—(mass, velocity, geometry)→injury—such a complete characterization of soft tissue is certainly not necessary for robot applications: the prediction of velocity limits for very small masses (<1 kg) is not important for two reasons:

Lower limit: the reflected inertia for robots that are typically employed in interactive applications is considerably greater, especially if the robot is equipped with a gripper/hand and/or tools.

Upper limit: a robot that is present in the immediate vicinity of a human being and/or that is cooperating with said human during work should certainly not exceed 4 to 5 m/s. It has already been demonstrated that ≈2 m/s is a reasonable maximum limit speed. This limit was derived from experiments on blunt impact to the head.

Moreover, an evaluation of speed limits for large masses (>20 kg) is not of crucial interest in service robotics since robots that are to interact safely with humans typically have a lightweight construction and therefore have a reflected inertia within the range from 1 kg to 15 kg and, in the case of very large reflected inertias (for example, in the vicinity of singularities), it does not make sense to reduce the speed below a certain value or to even stop the movement. Singularities are not taken into consideration at this juncture. They have to be analyzed in a different manner. Whereas the reflected mass approaches infinity, the velocity moves towards zero, that is to say, the kinetic energy is limited.

Finally, it seems appropriate to establish a maximum permissible velocity for small masses (e.g. 4.5 m/s) and to define a minimum velocity limit (e.g. 0.1 m/s) in order to prevent the robot from stopping in the vicinity of singularities. This is why all requisite information is acquired from the test results.

The last unresolved question is which representation reflects the limits in the mass-velocity characteristic curves. Initially, one would select a description in terms of physical quantities such as kinetic energy, force of contact or momentum. However, since a medical evaluation on the basis of the AO classification is available, the prediction of injuries does not require a physical model, but rather, it is exclusively data-driven. Therefore, in view of the complexity of human injury mechanisms, more consistent results can be obtained than with a model-based approach, which requires validation and potentially entails greater imprecisions. Consequently, all of the measurements of physical quantities during an experiment can be seen as supplementary information. However, they are not required for the mapping—(mass, velocity, geometry)—injury—(of a given part of the body). Since the mass and the velocity were associated with the "key impact" for experiments on the abdomen, the resulting safety curves for the abdomen in the experiments are simply three regression curves in the (mass/velocity)

plane for a given impact primitive. The maximally permissible velocity can be expressed as follows:

$$v_{max}(m) = \text{reg.lim}[c_1(i,a_i)m + c_2(i,a_i)v_1, v_2], \quad (1)$$

with the coefficient of the safety characteristic curves $c_1(i, a_i)<0$ and $c_2(i, a_i)$ for the primitive i. The parameters $v_1$, $v_2$ denote the minimally and maximally permissible velocities. It should be emphasized once again that no force sensor is needed in order to delimit the safety characteristic curves for the robot control. All that is needed is knowledge about the velocity of a varying mass at which a medically detectable injury occurs (that is to say, the mapping of the mass, velocity and geometry onto the medically observable injury). The sensor data, in contrast, can be employed for applications that explicitly require this such as, for instance, force-controlled tasks for predicting contact forces.

Figure 3:
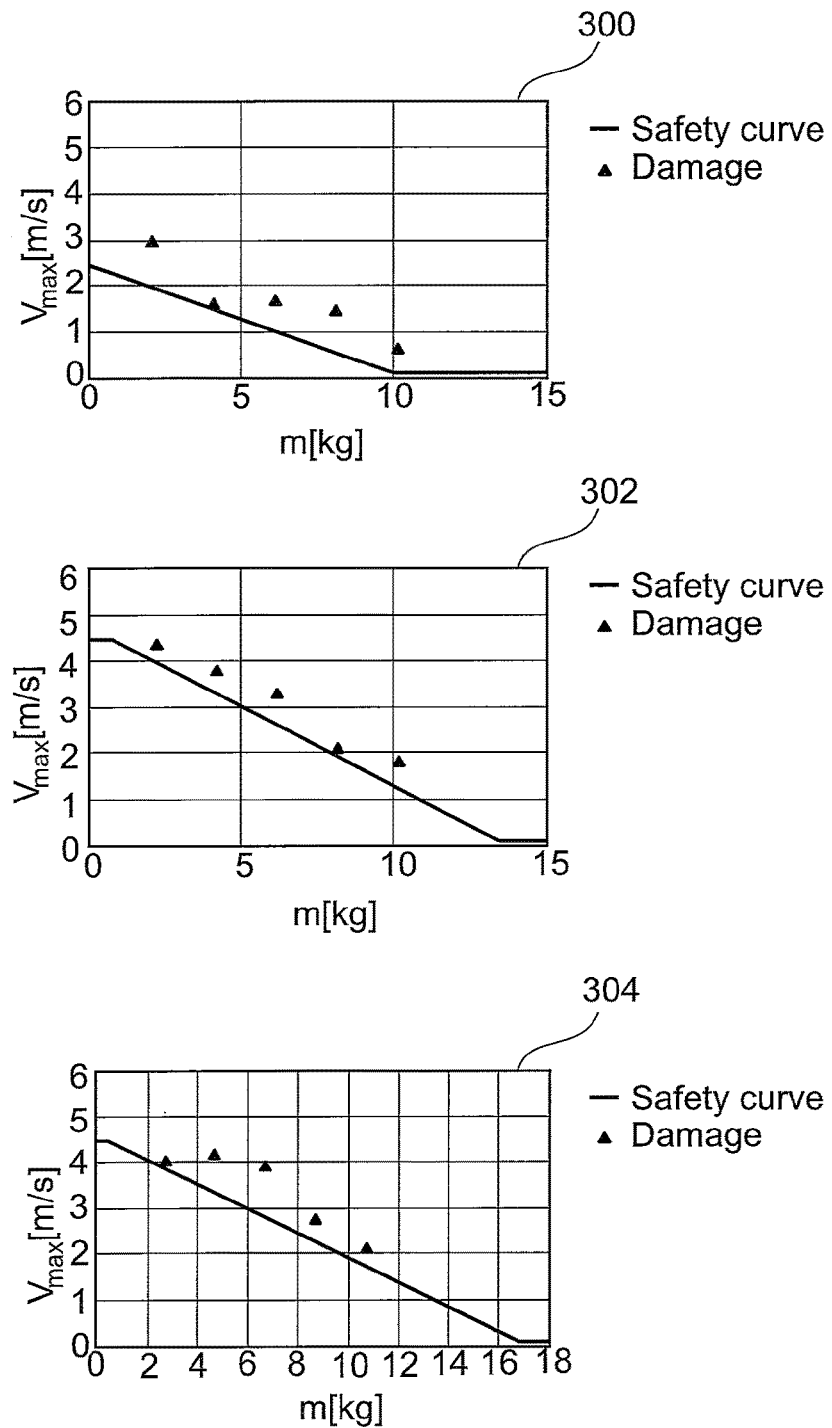
FIG. 3: conservative safety characteristic curves for different contact primitives.

FIG. 3 shows conservative safety characteristic curves for the contact primitives in the form of a small sphere in diagram 300, a large sphere in diagram 302 and a 45°-wedge in diagram 304, which are used in the real-time control procedure for the abdominal area.

The maximum speeds are evaluated within the range from 0.1 m/s to 4.5 m/s. The resulting characteristic curves are subsequently shifted conservatively so that all of the data points lie above the applicable limit. These characteristic curves form the basis for integrating interpretable knowledge about injury mechanisms into real-time robot control procedures, which will be described below.

Injury Database:

The described results of the impact tests yield safety curves that relate the maximum velocity and mass to the injury for a certain primitive and for a certain part of the body; see FIG. 3. Here, the objective is to make it possible for a robot to utilize this knowledge for purposes of limiting the velocity of moving parts in such a way that accidental collisions do not exceed a given limit value as set forth in the AO classification, here IC2. In order to attain the highest possible velocities while complying with a specific safety limitation, the mapping (mass, velocity) vis-à-vis observed injury has to be made available online. Such an injury database stores the coefficients of the safety characteristic curves (1) for each known contact primitive so that these can be utilized in real time to adapt the speed. In actual practice, end effectors or relevant robot structures cannot be represented by only one single contact primitive. These are rather complex geometric objects with varying characteristics. Owing to this large number of characteristics, it is naturally not practical to treat every single end effector/robot separately. For purposes of developing a methodical approach, end effectors are formally broken down into groups of geometrically coupled primitives.

The entire geometric structure of the broken-down end effectors can be expressed in terms of relative transformation matrices $^{EE}T_{Obj}$ between the end effector and the primitive-object reference coordinate system. The individual geometric, dynamic (obtained from a CAD model, dynamic identification, learning, etc.) and safety properties adequately describe the robot shell. It should be noted that no algorithm is given here for the automatic establishment of this relationship. Each relevant point that is to be monitored is defined as a point of interest (POI). Each primitive object consists of a set of POIs, the position of the center of gravity $^{Obj}x_{COG}$, the mass m, the inertia sensor I and the relative position to the end effector $^{EE}T_{Obj}$.

The following properties are associated with each POI. First of all, its relative pose in relation to the primitive-object reference coordinate system $^{Obj}T_{POI}$. Secondly, a set of geometric parameters PARAMS that represent the surface primitive SURFACE. Thirdly, an identifier SC-TYPE for the type of safety curve, here a limited regression. Fourthly, a set of coefficients COEFF that describe the corresponding safety curve. Together, COEFF, PARAMS and SC-TYPE form the PRIMITIVE structure for each POI.

The resulting database is formally represented as follows:

$$\text{SoEEs} = \{\text{SoObjects}^k \times \{^{EE}T_{Obj}\}^k\}$$

$$^{EE}T_{Obj} \in SE(3)$$

$$\text{SoObjects} = \{\text{POI}^m \times \mathbb{R}^3 \times \mathbb{R}^+ \times \mathbb{R}^{3\times 3}\}$$

$$\text{POI} = \{^{Obj}T_{POI} \times \text{PRIMITIVE}\}$$

$$^{Obj}T_{POI} \in SE(3)$$

$$\text{PRIMITIVE} = \{\text{COEFF} \times \text{PARAMS} \times \text{SC-TYPE}\}$$

$$\text{COEFF} \in \text{SoC(SC-TYPE)}$$

$$\text{PARAMS} \in \text{SoP(SURFACE)} \quad (2)$$

SoEES is the set of end effectors, while SoObjects is the set of primitive objects.

Since the injury database contains only relationships between the scalar mass, the velocity and the injury, the instantaneous reflected mass of a given POI and its target velocity have to be calculated for a given movement. Thus, the stored information can be employed in such a way that the target speed is scaled so as to be reduced under (1) in terms of the potential risk of injury.

Dynamics-Based Speed Scaling in Real Time:

1) Reflected mass at the POI: the dynamics of a rigid robot in the articulation space are described by $$M(q)\ddot{q} + C(q,\dot{q})\dot{q} \pm g(q) = \tau, \quad (3)$$

wherein $q \in \mathbb{R}^n$ stands for the vector of the articulation angle, $M(q) \in \mathbb{R}^{n \times n}$ stands for the inertia matrix, $C(q,\dot{q})$ stands for the centrifugal and Coriolis matrix, $g(q)$ stands for the gravity vector and $\tau$ stands for the articulation torque.

The relationship between the articulation velocities and the Cartesian velocities is expressed by $\dot{x} = J(q)\dot{q}$, wherein $J(q) \in \mathbb{R}^{6 \times n}$ is the corresponding Jacobian matrix. $M(q)$ and the Cartesian kinetic energy matrix $\Lambda(x)$ are interrelated as follows:

$$\Lambda(x) = (J(q)M(q)^{-1}J^T(q))^{-1}. \quad (4)$$

In this context, reference is made to the publication by O. Khatib, "Inertial properties in robotic manipulation: an object-level framework" *Int. J. Robotics Research*, vol. 14, no. 1, pp. 19-36, 1995.

On the basis of a breakdown of the kinetic energy matrix, the following inverse is obtained $$\Lambda^{-1}(q) = \begin{bmatrix} \Lambda_v^{-1}(q) & \overline{\Lambda}_{vw}(q) \\ \overline{\Lambda}_{vw}^T(q) & \Lambda_w^{-1}(q) \end{bmatrix}. \quad (5)$$

A scalar quantity is obtained which, in view of a force in the u-direction, represents the observable mass on the end effector, whereby u is a unit vector. This quantity is called the reflected robot inertia in the u-direction. It should be noted that the Jacobian matrix has to be the corresponding center-of-gravity Jacobi or, otherwise, the complete inverse from Equation (5) has to be utilized instead of only the translatory portion.

$$m_u = [u^T \Lambda_v^{-1}(q) u]^{-1} \quad (6)$$

In accordance with the results of the drop test, $m_u$ is needed in order determine the maximally permissible Cartesian velocity in the u-direction that satisfies the safety characteristic curve; see FIG. 3.

Subsequently, the maximally permissible velocity of a Cartesian point is derived which constitutes the foundation for the calculation of the safe robot speed.

2) Injury-based speed scaling: the following scheme yields a safe speed for any desired POI. It should be noted that all of the indices were left out for the sake of clarity. Moreover, the dependence of q has been left out wherever it is obvious. The base coordinate system of the robot is denoted as $\{0\}$, while that of the end effector (operational frame) is denoted as $\{EE\}$.

1) Evaluate the unit vector u that is perpendicular to the object surface of the POI (direction of the z-axis in POI coordinates), $$u = {}^0R_{POI} z_{POI} \qquad (7)$$

wherein ${}^0R_{POI}$ stands for the rotation matrix from POI coordinates in $\{0\}$ coordinates.

2) Calculate ${}^0v_{POI}$ on the basis of the end effector target velocity ${}^0v_{EE_d} = [{}^0\dot{x}_{EE_d} \; {}^0\omega_{EE_d}]^T$.

$$ {}^0v_{POI} = \begin{bmatrix} {}^0\dot{x}_{POI} \\ {}^0w_{POI} \end{bmatrix} = \begin{bmatrix} I_3 & -\hat{p}_{POI} \\ 0_3 & I_3 \end{bmatrix} \begin{bmatrix} {}^0\dot{x}_{EE_d} \\ {}^0w_{EE_d} \end{bmatrix}, \qquad (8) $$

wherein $p_{POI} = [p_{x,POI} \; p_{y,POI} \; p_{z,POI}]^T$ stands for the position vector of the POI in relation to $\{EE\}$.

The matrix $\hat{p}_{POI}$ is $$ \hat{p}_{POI} = \begin{bmatrix} 0 & -p_{z,POI} & p_{y,POI} \\ p_{z,POI} & 0 & -p_{x,POI} \\ -p_{y,POI} & p_{x,POI} & 0 \end{bmatrix}. \qquad (9) $$

3) Evaluation of the inverses of the Cartesian kinetic energy matrix at the POI:

$$\Lambda_{v,POI}^{-1} = J_{v,POI} M^{-1} J_{v,POI}^T \qquad (10)$$

4) Reflected inertia in the u-direction through (6):

$$m_{POI} = 1/(u^T \Lambda_{v,POI}^{-1} u) \qquad (11)$$

5) Derivation of the maximum velocity $v_{max}$ for $m_{POI}$ using the safety functions.

$$v_{max}(m) = \text{reg.lim}[c_1(i,a_i)m + c_2(i,a_i), v_1, v_2], \qquad (12)$$

6) Comparison of $v_{max}$ to the projection of ${}^0v_{POI}$ in the u-direction $v_{loc}$: if $\|v_{loc}\| \le \|v_{max}\|$, the target velocity is retained. If $\|v_{loc}\| > \|v_{max}\|$, the new velocity is ${}^0v'_{POI}$ $$ {}^0v'_{POI} = {}^0v_{POI} \frac{\|v_{max}\|}{\|v_{ori}\|}. $$

7) Finally, the new velocity ${}^0v_{EE}$ of the end effector is $$ {}^0v_{EE} = \begin{bmatrix} {}^0\dot{x}_{EE} \\ {}^0w_{EE} \end{bmatrix} = \begin{bmatrix} I_3 & \hat{p}_{POI} \\ 0_3 & I_3 \end{bmatrix} \begin{bmatrix} {}^0\dot{x}'_{POI} \\ {}^0w'_{POI} \end{bmatrix}. \qquad (13) $$

This procedure is repeated for each POI. The most conservative velocity ${}^0v_{EE}$ is selected as ${}^0v'_{EE}$.

A number of experiments will be discussed below to explain the system behavior in simple movements going from position A to position B. For this purpose, an articulated manipulator is fitted with an end effector made up of the primitives that had been previously used in the drop experiments.

Figure 4:
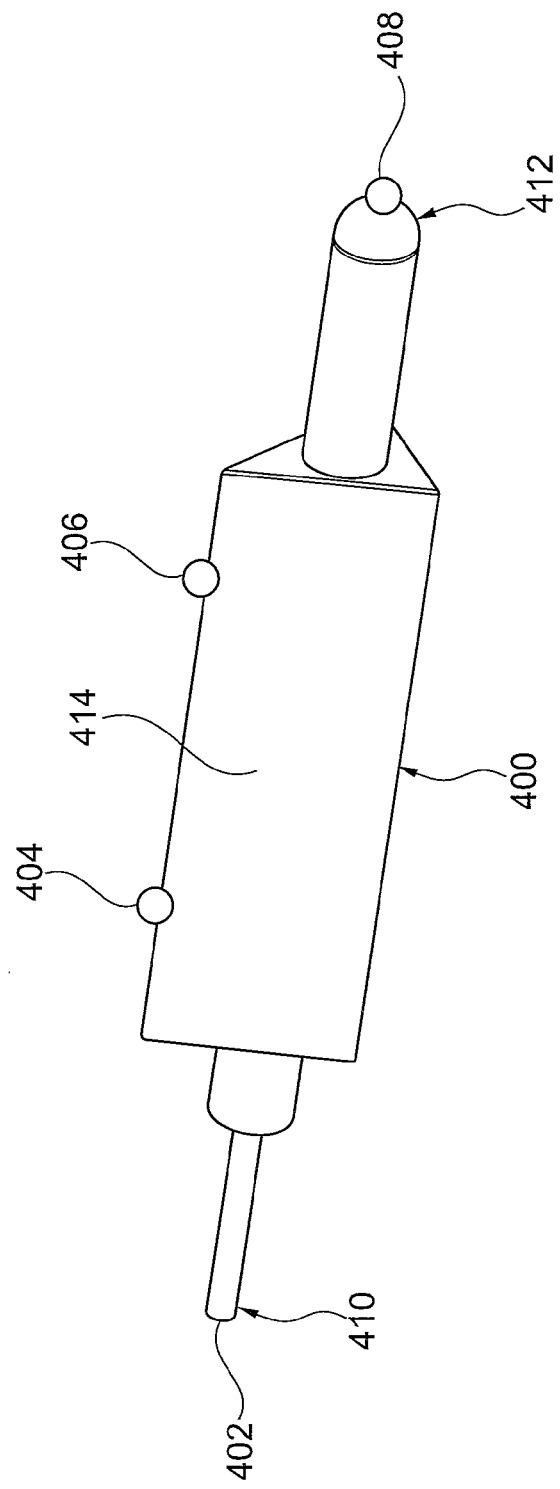
FIG. 4: an end effector consisting of contact primitives and associated POIs (points of interest)
Figure 5:
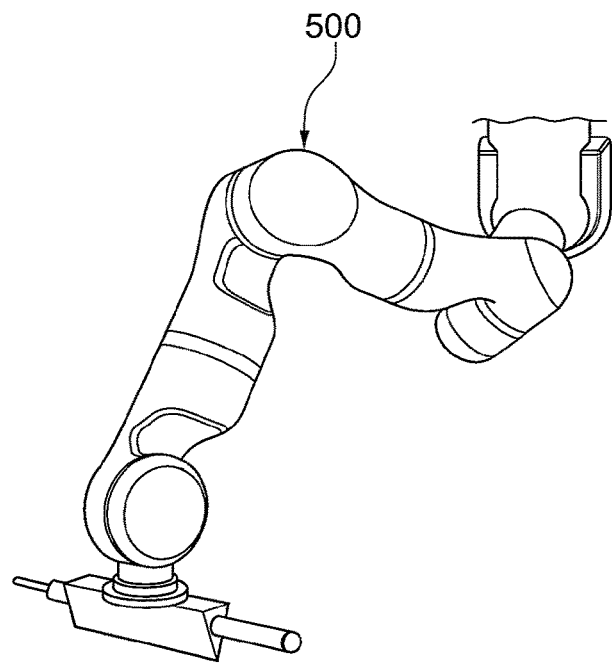
FIG. 5: a robot with the end effector for carrying out experiments.

Experiment:

FIG. 4 shows an end effector 400 consisting of contact primitives and the associated POIs 402, 404, 406, 408. FIG. 5 shows a robot 500 with the end effector 400 for carrying out experiments. In order to show the performance capability of the developed injury-based algorithm, the lightweight robot 500 is equipped with the end effector 400 consisting of the geometric primitives that were employed for the drop tests; see FIG. 4 and FIG. 5. For this end effector 400, four POIs 402, 404, 406, 408 were selected, namely, two (402, 408) at the tips of the spheres 410, 412 and two (404, 406) on the wedge 414. Two POIs 404, 406 have to be used for the wedge 414 since the width of the wedge 414 has a significant influence during a rotational movement. If, for example, two POIs 404, 406 are selected on the edge of wedge, then one of them is, without a doubt, the fastest point of the primitive.

The experiments conducted, however, cannot be utilized as a source of injury knowledge for the corners of the wedge 414 since the applicable analysis still has to be carried out. As a compromise, the two POIs 404, 406 are assigned to the distal ends of the primitive, whereby the velocity difference compared to that of the corners is negligible. Since the robot 500 was developed explicitly for a very delicate and safe interaction, its lightweight design is one of its most important properties.

Since the robot 500 with the appertaining tools is not capable of generating potentially "unsafe" movements in view of its maximum speed and inertia properties, the safety characteristic curves are shifted to such an extent that the effect of the safe velocity controller (SVC) is also evident for this manipulator; scaling factor of 0.2.

Figure 6:
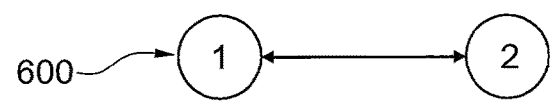
FIG. 6: trajectories of a line test and of a ribbon test.
Figure 6:
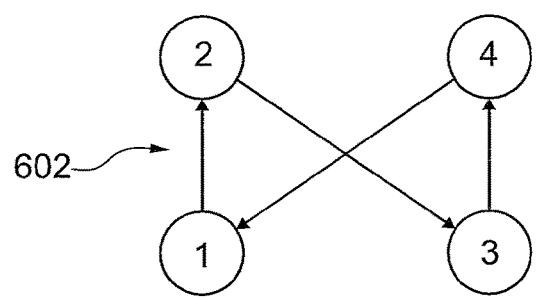

Experiments for two different types of movement were conducted. FIG. 6 shows the trajectories of a line test 600 and of a ribbon test 602. In the line test 600, the end effector 400 moves laterally (${}^0$y-direction) between two positions. In the ribbon test 602, the robot 400 moves crosswise to four different positions, combining vertical and horizontal movements in this process.

Figure 7:
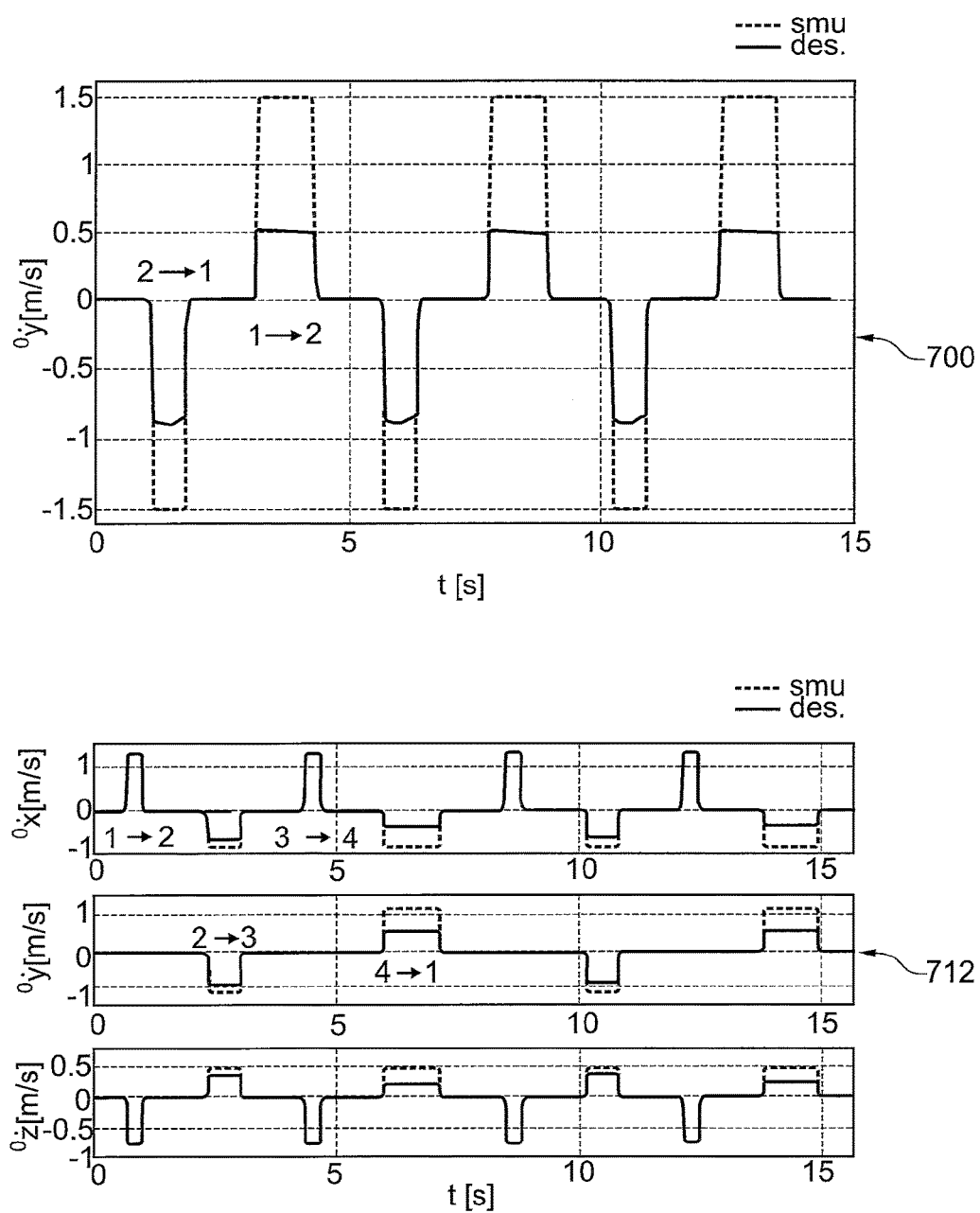
FIG. 7: a "line test" and "ribbon test" SVC (safe velocity controller) experiment.

FIG. 7 shows an SVC experiment comprising a "line test" and a "ribbon test". The diagram 700 depicts the results of the line test 600. The end effector 400 is supposed to move at a velocity of 1.5 m/s between two target configurations. The SVC, however, limits the velocity as a function of the reflected inertia and the direction of movement of the robot 400. During the movement in the positive ${}^0$y-direction, the POI 402 is the critical POI, while the POI 408 is the critical POI in the negative direction.

Since the safety characteristic curve associated with POI 402 is more restrictive than that of POI 408 (the small sphere is more dangerous than the large sphere), the SVC reduces the maximum velocity more markedly in the positive ${}^0$y-direction. The results of the ribbon test 602 are depicted in the diagram 702.

Since the coordinate system of the end effector ($\{0\}$ coordinate) is rotated with respect to the Cartesian world coordinate system ($\{W\}$ coordinate system), the velocity for all three dimensions is presented. Lateral movements are represented as the $^0$y-direction. Vertical movements have entries in the $^0$x-direction as well as in the $^0$z-direction.

Accordingly, the segments 1-2 and 3-4 in FIG. 7 (upwards movement of the end effector 400) correspond to the positive $^0$x-direction and to the negative $^0$z-direction in FIG. 7. In contrast to this, the segments 2-3 and 4-1 correspond to the negative $^0$x-movement and to the positive $^0$z-movements. For lateral movements, the segments 2-3 and 4-1 denote negative and positive $^0$y-movements. In FIG. 7, it can be seen that the SVC restricts the 4-1 movement more markedly than the 2-3 movement. This can be explained by the fact that, in this direction, POI 402, which is associated with the small sphere, is relevant. In spite of this fact, POI 404 and POI 406 contribute to limiting the velocity. Due to the symmetry of the end effector 400, they equally influence the velocity limits along 4-1 and 2-3 to equal extents. Finally, it can be seen that the velocity in upwards movements (1-2 and 3-4) has not yet been limited by the controller. This can be explained by the fact that the POIs 402, 404, 406, 408 were assigned exclusively frontally and laterally, and none at the rear part of the end effector 400.

SUMMARY

Drop test experiments are presented here involving varying masses, velocities and geometries on pig-abdomen wall specimens. The purpose of the study is to generate fundamental injury data that does not yet exist, either in biomechanics or in forensics. Moreover, an approach is being put forward to utilize a medical evaluation and classification in order to generate an adequate representation of injury knowledge so as to allow further algorithmic processing. The basis of the evaluation is the so-called AO classification. Generally speaking, this allows an objective description of soft-tissue damage on the basis of medical observations. IC2 (contusion without opening of the skin) is selected as the maximally permissible injury limit. Thirdly, risk graphs are drawn up that represent a "safe" speed, at a given instantaneous configuration, mass, surface geometry and part of the body involved in the collision. Moreover, a real-time injury database architecture is being put forward that makes the generated results accessible in real time. Finally, a real-time controller is being designed and experimentally verified which limits the end-effector velocity on the basis of the reflected inertia and the geometric surface properties of the end effector. This device ensures that, thanks to the utilization of the knowledge from the injury database, a possible collision with a human (human abdomen) cannot cause injuries above a certain predefined degree. Finally, it should be pointed out that existing work on blunt human-robot collisions can be integrated very easily into this architecture and algorithm, which makes the present approach very generic.

REFERENCE NUMERALS

100 small sphere
102 large sphere
104 wedge
200 diagram
202 diagram
204 diagram
206 diagram
208 diagram
210 diagram
212 diagram
214 diagram
216 diagram
300 diagram
302 diagram
304 diagram
400 end effector
402 POI
404 POI
406 POI
408 POI
410 sphere
412 sphere
414 wedge
500 robot
600 line test
602 ribbon test
700 diagram
702 diagram

What is claimed is:

1. A method for controlling a robot device having a movable manipulator or effector comprising:
   providing a database storing medical injury parameters, the medical injury parameters being derived to represent a functional relationship between dynamics of the robot device, geometric primitives of the robot device and biomechanical injury data acquired from results of collision tests;
   monitoring a speed or direction of movement of the manipulator or effector to determine dynamics of the robot device and comparing the dynamics and geometric primitives of the robot device with the stored medical injury parameters, and
   adapting the speed or direction as function of the comparison of the dynamics and geometric primitives of the robot device with the stored medical injury parameters to prevent the speed or direction of movement of the manipulator or effector from approaching a value of the medical injury parameters associated with causing injuries to a human above a certain predefined degree.

2. The method as recited in claim 1 wherein the monitoring is a function of includes comparing an impact mass, an impact velocity or an impact-contact geometry of the manipulator or effector with the stored medical injury parameters.

3. The method as recited in claim 1 wherein the monitoring includes comparing an anticipated impact mass, impact velocity or impact-contact geometry of at least one prescribed relevant point of the manipulator or effector with the stored medical injury parameters.

4. The method as recited in claim 1 wherein the stored medical injury parameters include characteristic values, the characteristic values reflecting a relationship between an impact mass, an impact velocity or an impact-contact geometry of the manipulator or effector, and the medical injury parameters.

5. The method as recited in claim 4 wherein the characteristic values are depicted in mass-velocity diagrams for different contact geometries and different types of injury.

6. The method as recited in claim 1 wherein the medical injury parameters are obtained from a memory unit.

7. The method as recited in claim 1 wherein the monitoring includes using at least one adjustable threshold value.

8. The method as recited in claim 1 wherein the method is carried out in real time.

9. The method as recited in claim 1 wherein the method is carried out on a level of commands or on a level of measured values.

10. A non-transitory computer readable medium including a computer program product downloadable into a computing unit and comprising software code segments, the method as recited in claim 1 being carried out with the software code segments when the product is running on the computing unit, the computing unit controlling the robot device in accordance with the software code segments.

11. The method as recited in claim 1 wherein the relationship is provided as a characteristic curve.

12. The method as recited in claim 1 wherein the relationship is given as:

$$v_{max}(m) = \text{reg.lim}[c_1(i,a_i)*m + c_2(i,a_i) v_1, v_2],$$

where:
   $c_1(i, a_i)$ is a coefficient of the safety characteristic curves,
   $c_2(i, a_i)$ is a coefficient for the primitive I,
   $v_1$ denotes a minimally permissible velocity,
   $v_2$ denotes a maximally permissible velocity.

13. The method as recited in claim 1 wherein each of the relevant points POI is associated with the following information:
   a relative pose $^{Obj}T_{POI}$ in relation to the primitive object reference coordinate system,
   a set of geometric parameters PARAMS that represent a surface primitive SURFACE,
   an identifier SC-TYPE for the type of the provided relationship between a scalar mass m, a maximum velocity $v_{max}(m)$ depending on the mass m and a medical injury for each of the primitive objects and for a certain part of a human body, and
   a set of coefficients COEFF that describe the corresponding relationship.

14. The method as recited in claim 13 wherein the information associated with the relevant points POI is provided in a database.

15. A robot device comprising:
a movable manipulator or effector; and
a control unit having a computing unit and a memory unit, the memory unit including a database storing medical injury parameters, the medical injury parameters being derived to represent a functional relationship between dynamics of the robot device, geometric primitives of the robot device and biomechanical injury data acquired from results of collision tests, the control unit configured for monitoring a speed or direction of movement of the manipulator or effector to determine dynamics of the robot device and comparing the dynamics and geometric primitives of the robot device with the stored medical injury parameters, and adapting the speed or direction as function of the comparison of the dynamics and geometric primitives of the robot device with the stored medical injury parameters to prevent the speed or direction of movement of the manipulator or effector from approaching a value of the medical injury parameters associated with causing injuries to a human above a certain predefined degree.

16. A method for controlling a robot device having a movable manipulator or effector comprising monitoring a speed or direction of the movement of the manipulator or effector depending on medical injury parameters and on dynamics of the robot, and adapting the speed or direction as a function of the monitoring, wherein the manipulator or effector is characterized by a group of geometrically coupled primitive objects and wherein a set of relevant points POI is defined for each of the primitive objects, comprising the steps of:
   providing a relationship between a scalar mass m, a maximum velocity $v_{max}(m)$ depending on the mass m and a medical injury for each of the primitive objects and for a certain part of a human body;
   providing a target movement for the manipulator or effector;
   depending on the target movement of the manipulator or effector, determining, for each of the relevant points POI of the primitive objects, a reflected mass $m_u$ of the manipulator or effector;
   depending on the target movement of the manipulator or effector and on the determined reflected masses $m_u$ and based on the relationship provided, determining a maximum velocity $v_{max}(m_u)$ for each of the relevant points POI; and
   comparing, for each of the relevant points POI, a POI target velocity, which result from the target movement of the manipulator or effector, and the determined maximum velocity $v_{max}(m_u)$ dedicated to the respective POI, and in case a POI target velocity exceeds the dedicated maximum velocity $v_{max}(m_u)$, preventing the respective POI target velocity from exceeding the relevant maximum velocity $v_{max}(m_u)$.

17. A robot device comprising:
a movable manipulator or effector; and
a control unit having a computing unit and a memory unit, the computing unit monitoring a speed or direction of the movement of the manipulator or effector depending on medical injury parameters and on dynamics of the robot, and adapting the speed or direction as a function of the monitoring, wherein the manipulator or effector is characterized by a group of geometrically coupled primitive objects and wherein a set of relevant points POI is defined for each of the primitive objects, the computer unit being programmed to execute the following steps:
   providing a relationship between a scalar mass m, a maximum velocity $v_{max}(m)$ depending on the mass m and a medical injury for each of the primitive objects and for a certain part of a human body,
   providing a target movement for the manipulator or effector,
   depending on the target movement of the manipulator or effector, determining, for each of the relevant points POI of the primitive objects, a reflected mass $m_u$ of the manipulator or effector,
   depending on the target movement of the manipulator or effector and on the determined reflected masses $m_u$, and based on the relationship provided, determining a maximum velocity $v_{max}(m_u)$ for each of the relevant points POI, and
   comparing, for each of the relevant points POI, a POI target velocity, which result from the target movement of the manipulator or effector, and the determined maximum velocity $v_{max}(m_u)$ dedicated to the respective POI, and in case a POI target velocity exceeds the dedicated maximum velocity $v_{max}(m_u)$, preventing the respective POI target velocity from exceeding the relevant maximum velocity $v_{max}(m_u)$.

* * * * *